(12) United States Patent
McClintock (10) Patent No.: US 11,692,863 B2
(45) Date of Patent: *Jul. 4, 2023

(54) PORTABLE VERIFICATION SYSTEM AND METHOD FOR USE IN VERIFYING A GAS PIPELINE FLOW METER WHEN IN FIELD

(71) Applicant: Big Elk Energy Systems, LLC, Tulsa, OK (US)

(72) Inventor: Dennis McClintock, Tulsa, OK (US)

(73) Assignee: Big Elk Energy Systems, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,651

(22) Filed: Sep. 3, 2021

(65) Prior Publication Data

US 2022/0113181 A1 Apr. 14, 2022

Related U.S. Application Data

(63) Continuation of application No. 16/291,508, filed on Mar. 4, 2019, now Pat. No. 11,112,295, which is a
(Continued)

(51) Int. Cl.
*G01F 25/10* (2022.01)
*G01F 1/66* (2022.01)
(Continued)

(52) U.S. Cl.
CPC .............. *G01F 25/15* (2022.01); *G01F 25/13* (2022.01); *F16L 17/00* (2013.01); *G01F 1/66* (2013.01); *G01F 15/005* (2013.01)

(58) Field of Classification Search
CPC .. G01F 25/0053; G01F 25/003; G01F 15/005; G01F 1/66; F16L 17/00; F16L 27/125
See application file for complete search history.

(56) References Cited

U.S. PATENT DOCUMENTS 1,492,204 A 4/1924 Clark
3,446,055 A 5/1969 Tuck et al.
(Continued)

OTHER PUBLICATIONS

Rudroff, Daniel J., Onsite Proving of Gas Flow Meters, 2011 (Year: 2011).*
(Continued)

*Primary Examiner* — Eric S. McCall
*Assistant Examiner* — Timothy P Graves
(74) *Attorney, Agent, or Firm* — GableGotwals (57) ABSTRACT

Embodiments of a portable verification system can move from one in-field gas flow meter location to another and temporarily connect downstream of a main pipeline's meter run or station. A control valve of the portable verification system allows volume measurement at different flow velocities to be verified. In some embodiments, the portable verification system is connected to the meter run and the main pipeline by an adjustable pipeline section. This section can extend horizontally and vertically, as well as swivel to provide versatility when connecting in the field. Adaptor fittings having one flange sized for and fitted to the inlet and outlet ends of the portable verification system and another flange sized for the meter run or main pipeline connection provide additional versatility. Downtime is limited to the time required to complete a circuit between the meter run, portable verification system, and main pipeline.

24 Claims, 7 Drawing Sheets

Related U.S. Application Data continuation of application No. 15/588,630, filed on May 6, 2017, now Pat. No. 10,222,252.

(60) Provisional application No. 62/333,015, filed on May 6, 2016.

(51) Int. Cl.
*G01F 15/00* (2006.01)
*F16L 17/00* (2006.01)

(56) References Cited

U.S. PATENT DOCUMENTS

| | | | |
|---|---|---|---|
| 3,958,443 | A | 5/1976 | Berrettini |
| 4,106,328 | A | 8/1978 | Neeff |
| 4,646,575 | A | 3/1987 | O'Hair et al. |
| 4,821,557 | A * | 4/1989 | Beeson, III ............. G01F 25/15 73/1.26 |
| 5,060,514 | A | 10/1991 | Aylsworth |
| 5,207,088 | A | 5/1993 | Geery |
| 5,421,188 | A | 6/1995 | Sager |
| 5,895,863 | A | 4/1999 | Glaudel et al. |
| 6,471,249 | B1 | 10/2002 | Lewis |
| 6,629,447 | B1 | 10/2003 | Collins |
| 6,721,674 | B2 | 4/2004 | Borzsonji |
| 7,475,586 | B2 | 1/2009 | Swanek |
| 7,685,861 | B2 | 3/2010 | Lynch et al. |
| 7,942,068 | B2 | 5/2011 | Ao et al. |
| 8,302,455 | B2 | 11/2012 | Straub, Jr. |
| 8,816,866 | B2 | 8/2014 | Day |
| 9,010,196 | B2 | 4/2015 | Kurth et al. |
| 9,316,517 | B2 | 4/2016 | Forbes et al. |
| 2009/0205400 | A1 | 8/2009 | McPeak |
| 2013/0080080 | A1 | 3/2013 | Forbes et al. |
| 2013/0179374 | A1 | 7/2013 | Hains et al. |
| 2013/0340519 | A1 | 12/2013 | Kurth et al. |
| 2015/0021908 | A1 * | 1/2015 | Cronin ................ F16J 15/3236 285/302 |

OTHER PUBLICATIONS

Bowles Jr., "In-situ (on-site) gas meter proving.", International School of Hydrocarbon Measurement—87th Annual International School of Hydrocarbon Measurement 2012, 2012, pp. 760-769, vol. 2, Publisher: www.measurementlibrary.com (accessed Jan. 9, 2018).

FMC Technologies, "Multipath Ultrasonic Gas Flow Meter; Flow Calibration Procedure; Procedure Manual", Oct. 2009.

Haner, "ultrasonic Flow Meter Calibration",, Publisher: TransCanada Calibrations; 2009.

Academic Press Dictionary of Science & Technology, "meter run definition".

Rudroff, "Onsite Proving of Gas Flow Meters", http://asgmt.com/wp-content/uploads/pdf-docs/2011/1/M30.pdf, 2011, Publisher: Welker Flow Measurement Systems Inc.

* cited by examiner

PORTABLE VERIFICATION SYSTEM AND METHOD FOR USE IN VERIFYING A GAS PIPELINE FLOW METER WHEN IN FIELD

CROSS-REFERENCE TO PENDING APPLICATIONS

This application is a continuation application which claims priority to U.S. patent application Ser. No. 16/291,508 filed Mar. 4, 2019 which claims priority to and the benefit of U.S. patent application Ser. No. 15/588,630 filed May 6, 2017, U.S. Pat. No. 10,222,252, which claimed priority to U.S. Provisional Application No. 62/333,015 filed May 6, 2016.

BACKGROUND

This disclosure relates to gas flow measurement equipment and, in particular, to equipment, systems, and methods designed to improve the accuracy of gas flow measurement used in custody transfer transactions along a gas pipeline.

Natural gas transmission pipelines, like those used in interstate transmission, are typically 6 inches or larger in diameter. Connected to these pipelines are in-field gas flow meter runs. These runs may include an ultrasonic gas flow meter that is used to measure the transfer of gas flowing along these lines between pipeline companies. Other runs may include a turbine or orifice meter. Regardless of the type of meter, the meter's accuracy may erode over time.

Figure 1:
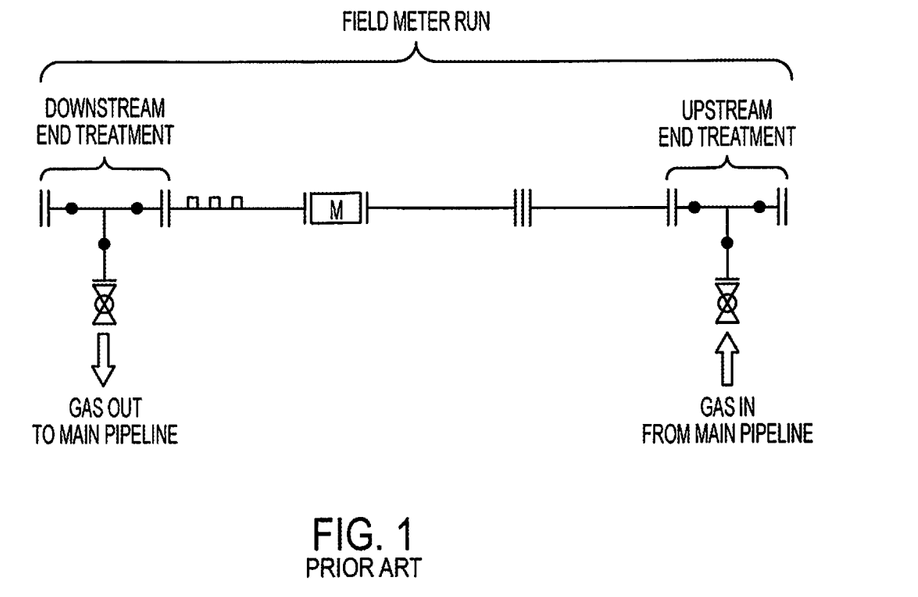
FIG. 1 is a schematic of a prior art field meter run connected to a main pipeline. When the in-field gas flow meter of the run requires calibration or verification, the main pipeline must be shut down to remove the field meter and remain shut down until the meter is returned from a calibration lab and reinstalled with its piping geometry.

Because of the tremendous volume of gas being transferred between pipeline companies, small measurement errors can have very large financial effects. Therefore, in-field gas flow meters used in gas pipelines should be calibrated from time-to-time. However, doing this calibration requires shutting down flow through the pipeline, removing the meter run from the line, see FIG. 1, and sending the meter run to a calibration laboratory that makes use of a reference bank of meters. See FIG. 1. Additionally, as persons of ordinary skill would know, the meter is calibrated for the specific piping geometry of the run and there must be sufficient length ahead of and behind the meter in the run for accurate measurement of flow through the meter (e.g. AGA-9). These piping geometries differ from one run to the next, even on the same main pipeline.

Until the calibrated field meter run is returned from the laboratory, which is typically a week or more, and reinstalled in the line, no gas is flowing through the line. The cost and lost revenue associated with this shutdown prevents many pipeline owners from calibrating the meter as often as it should be calibrated.

SUMMARY

Embodiments of a portable verification system can move from one in-field gas flow meter location to another in-field gas flow meter location and temporarily connect downstream of a main pipeline's meter run or station. A same volume of gas that passes through the field meter also passes through a calibrated ultrasonic gas flow meter (the reference meter) of the portable verification system before the volume of gas reenters the main pipeline. A control valve of the portable verification system allows volume measurement at different flow velocities to be verified. The volume of gas measured by the field meter is then compared with that of the portable verification system's calibrated meter. The field meter or its data can then be adjusted as needed.

In some embodiments, the portable verification system is connected to the meter run and the main pipeline by linearly adjustable pipeline sections. These sections can be arranged to extend horizontally and vertically, as well as swivel to provide versatility when connecting in the field. Adaptor fittings having one flange sized for and fitted to the inlet and outlet ends of the portable verification system and another flange sized for the meter run or main pipeline connection provide additional versatility.

After the field meter is verified to a desired level of accuracy, the portable verification system can be disconnected and the meter run reconnected to the main pipeline for usual flow from the run to the pipeline. The portable verification system can then be transported to another field location. If a decision is made to send the field meter to a calibration lab for calibration, the portable verification system can remain in place until the newly calibrated field meter is returned and reinstalled in the meter run.

Embodiments of a portable verification system of this disclosure are moveable between, and connectable to, a first in-field gas flow meter run having a first piping geometry and a second different in-field gas flow meter run having a second different piping geometry; said meter runs located at and connected to, respectively, a first main pipeline section at a first field location and a second different main pipeline section at a second different field location; the first in-field gas flow meter run including a first in-field gas flow meter previously calibrated for use with the first piping geometry and the second different in-field gas flow meter run including a second gas flow meter previously calibrated for use with the second different piping geometry; the portable verification system including a wheeled trailer; a reference meter run having a third different piping geometry mounted on the wheeled trailer and independent of that of the first and second different piping geometries and including a single meter tube; an ultrasonic gas flow meter contained by the single meter tube and calibrated for use with the third different piping geometry; and a field adjustable piping section having a fourth different geometry; the third different piping geometry further including an inlet piping of effective length for use in ultrasonic gas flow measurement and connected at one end to an inlet end of the single meter tube; an outlet piping of effective length for use in ultrasonic gas flow measurement and connected at one end to an outlet end of the single meter tube; the fourth different piping geometry including an adjustable inlet piping connectable at one end to the inlet piping of the mobile reference meter run and at another end to a downstream end of a respective field meter run of the first and second in-field gas flow meter runs; and an adjustable outlet piping connectable at one end to the outlet piping of the mobile reference meter run and at another end to a respective main pipeline section of the first and second different main pipeline sections; the adjustable inlet and outlet piping configured for adjustment in horizontal length, vertical height, and clock position relative to a horizontal plane, said adjustment not affecting a gas flow measurement of the ultrasonic gas flow meter of the reference meter run.

Embodiments of a method of verifying a first in-field gas flow meter when connected to a first main pipeline section transporting natural gas include completing a circuit between the first in-field gas flow meter run, a portable verification system, and the first main pipeline section; permitting the natural gas to flow from the first main pipeline section through the first in-field gas flow meter run and into and through the portable verification system and back into the first main pipeline section; and measuring an amount of natural gas flowing through the first in-field gas flow meter run and through the portable verification system; wherein the first in-field gas flow meter is connected to the first main pipeline section by a first in-field gas flow meter run having a first piping geometry, the first in-field gas flow meter previously calibrated for use with the first piping geometry; and wherein the portable verification system includes a reference meter run having a third different piping geometry, an ultrasonic gas flow meter contained by a single meter tube and calibrated for use with the third different piping geometry, and a field adjustable piping section having a fourth different piping geometry; and wherein the completing the circuit includes adjusting the field adjustable section, the field adjustable section when in a connected state not affecting a gas flow measurement of the ultrasonic gas flow meter of the reference meter run. The portable verification system may then be disconnected, moved, and connected to a second in-field gas flow meter connected to a second different main pipeline section transporting natural gas, the second in-field gas flow meter connected to the second different main pipeline section by a second different in-field gas flow meter run having a second different piping geometry, the second different in-field gas flow meter previously calibrated for use with the second different piping geometry.

ELEMENTS AND NUMBERING USED IN THE DRAWINGS AND DETAILED DESCRIPTION

5 Portable verification system or mobile reference meter system
10 Pipe or piping
$10_I$ or 10$i$ Inlet piping
$10_O$ or 10$o$ Outlet piping
11 Inlet end
12 Meter tube
13 Reference measurement section or meter run
14 Inlet end of 12
15 Calibrated ultrasonic gas flow meter (reference meter)
16 Outlet end of 12
17 Turn
19 Control valve
21 Outlet end
23 Measurement trailer
30 First slip or linear adjustable pipeline section (horizontal)
31 End (inlet or outlet depending on direction of flow)
33 Outer pipe
35 End
37 Inner pipe
41 End (inlet or outlet depending on direction of flow)
43 Lift eye
45 Elbow
47 Lift eye
49 Lap joint flange
50 Sealing means
51 Slip joint or slip joint adaptor
53 Packing gland
55 Head
57 Pocket
59 O-ring
61 Spacer
63 Follower or pusher
70 Second slip linear adjustable pipeline section (vertical)
90 Adaptor
91 Flange
93 First end
95 Bolt hole pattern
97 Flange
99 Second end
101 Bolt hole pattern
130 Pneumatic suspension devices or air springs
M In-field meter (meter under test)

DETAILED DESCRIPTION

Figure 2:
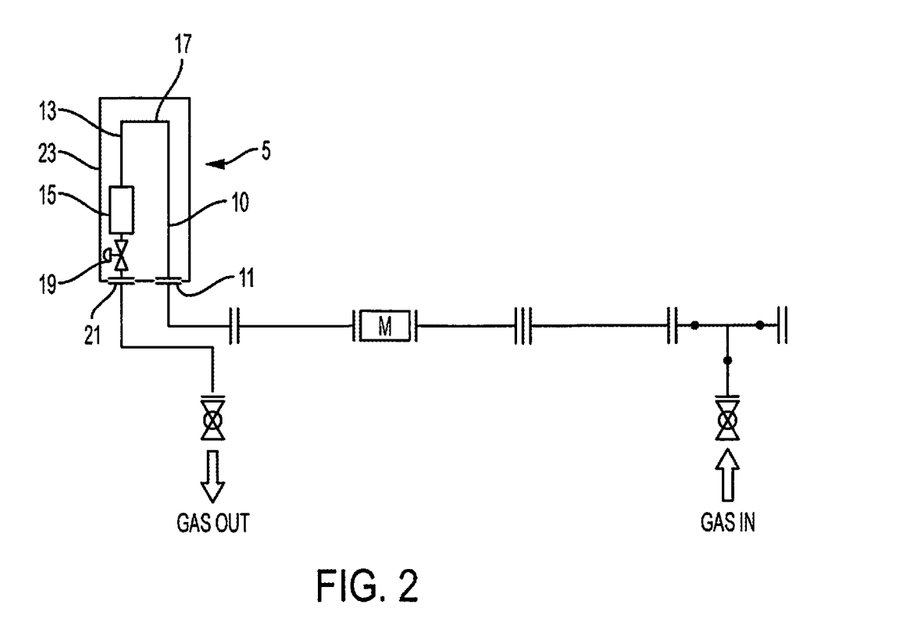
FIG. 2 is a schematic of an embodiment of portable verification system when connected to a downstream end of the field meter run. Gas flows through the field meter run and through a calibrated ultrasonic gas flow meter of the portable verification system before returning to the main pipeline. The main pipeline is shut down only for the amount of time required to complete a circuit between the field meter run, the portable verification system, and the main pipeline.

Referring now to FIG. 2, in embodiments of a portable verification system 5 a reference measurement section or meter run 13 is trailered to a main pipeline transporting gas and connected downstream of the main pipeline's meter run or station. In some embodiments, the portable verification system 5 is mounted on a measurement trailer 23. The trailer 23 may be no wider than a standard flatbed trailer (about 102″ in width). The amount of downtime experienced by the main pipeline is limited to the amount of time needed to complete a circuit between a downstream end of the field meter run, the portable verification system 5, and the main pipeline. In some embodiments, this circuit can be completed in less than 12 hours, less than 10 hours, or less than 8 hours. Disconnection of the system 5 and reconnection of the field meter run to the main pipeline may be accomplished in similar time frames.

The reference meter run 13 includes an inlet piping run $10_I$ having an inlet end 11 connectable to an end treatment of the field meter run, an outlet piping run $10_O$ having an outlet end 21 connectable to a flanged connection fitting of the main pipeline, and a calibrated ultrasonic gas flow meter (the reference meter) 15 located between the inlet end and outlet ends 11, 21. Gas flowing through the field meter M enters the portable verification system 5 and flows through the calibrated ultrasonic flow meter 15 of the reference meter run 13. The gas then flows back into the main pipeline. The meter 15 may be contained in a meter tube 12 of a kind known in the art having one flanged end 14 connected to the inlet piping $10_I$ of the run 13 and another flanged end 16 connected to the outlet piping $10_O$.

As persons of ordinary skill in the art would recognize, the meter 15 must be calibrated for use with the piping geometry of the run 13 and the length of the piping 10 ahead of and behind the meter 15 must be of effective length relative for use in ultrasonic gas flow measurement. The effective length is typically a function of the pipe diameter. The reference meter run 13 may include a piping geometry having at least one turn 17 between the ends 11, 21 and can be arranged in some embodiments as a U-shaped or C-shaped run. In embodiments, the reference meter run 13 also may include a flow conditioner located ahead of the meter 15. The run 13 may also include means to attenuate ultrasonic waves and prevent their return toward, and interference with, the meter 15. Those means include elbows and blind flanges.

The pipe 10 used in the portable verification system 5 can be the same diameter as that of the main pipeline's meter run. For example, if the field meter run uses 12-inch pipe, system 5 can use 12-inch pipe. In other embodiments, a different size (larger or smaller) pipe. Where different size pipe is used, appropriate adjustments are made to equate the volume of gas flowing per unit time through the field meter M with that flowing through the calibrated ultrasonic gas flow meter 15. In other words, the calibrated reference meter 15 experiences the same volume of gas the field meter M experiences at either the same velocity as the field meter M or at a proportional velocity. Because the meter 15 is located downstream of the field meter M, the flow through the field meter M is an unadulterated flow, unaffected by the presence of the portable verification system 5. Additionally, because the reference meter run 13 is a known piping geometry, the reference meter 15 is unaffected by connections to the field meter run which has different piping geometry than that of the reference meter run 13. Because the distance to, relative height between, and clock position of the trailer 15 to the field meter run and main pipeline will differ from field location to field location, the connections should be adjustable in length, height, and clock position (relative to a horizontal plane).

A control valve 19 may be installed downstream of the calibrated ultrasonic gas flow meter 15, such as between the meter 15 and the outlet end 21, to restrict flow through the valve 19 and drop flow velocity through the field meter M by way of backpressure. For example, if the flow is 55 fps through the field meter M, flow can be restricted through the valve 19 to drop the flow to rates below 55 fps and at or above 5 fps. Depending on whether size-on-size piping is used, the calibrated ultrasonic flow meter 15 experiences the same or a proportional velocity through it. In some embodiments, at least three different flow rates are selected, with corresponding volume measurement data provided for verification purposes.

Figure 3A:
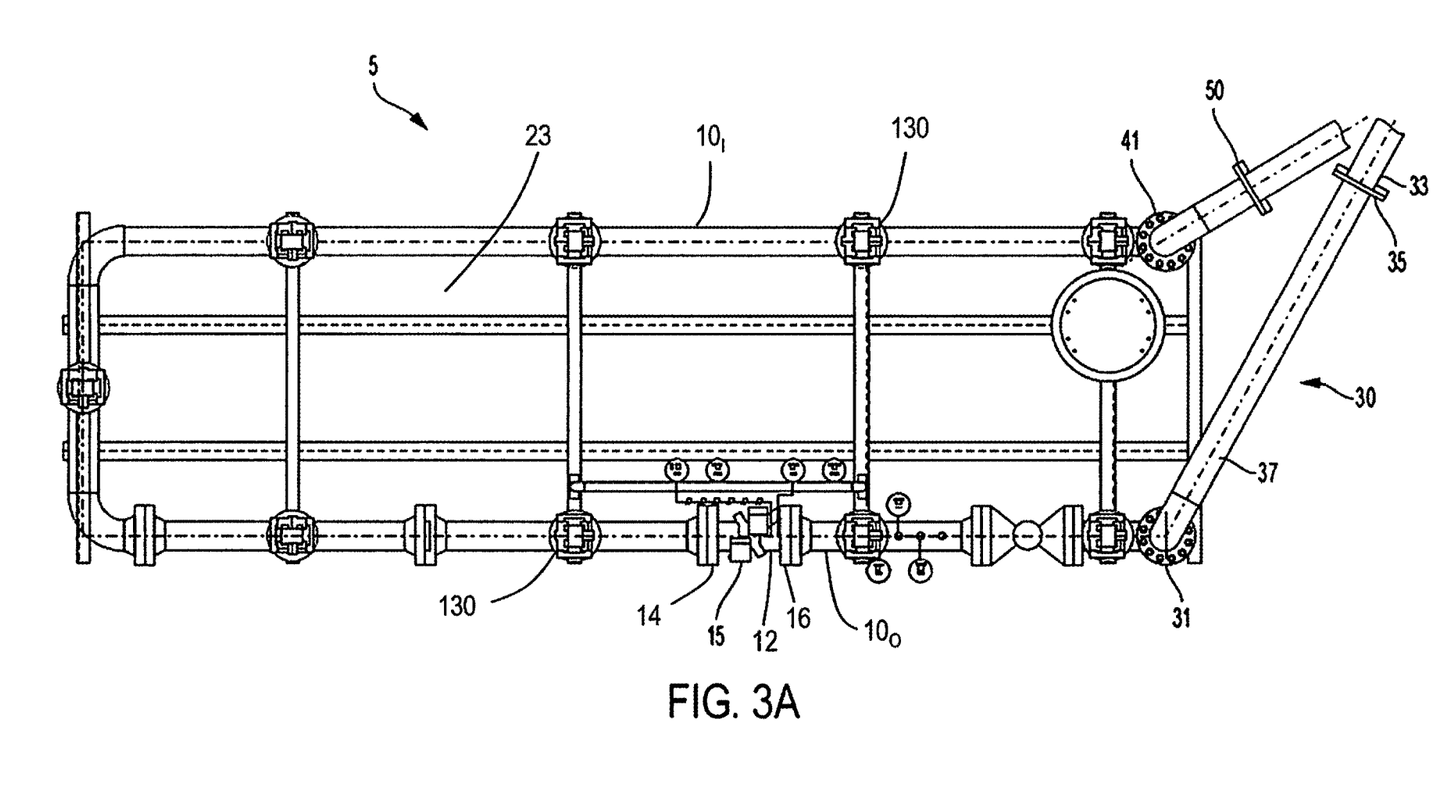
FIGS. 3A and 3B are a schematic of an embodiment of a portable verification system that includes a linearly adjustable pipeline section (see FIG. 3A) connecting the system to a field meter run of a main pipeline (see FIG. 3B). The adjustable pipeline section may be arranged to extend horizontally as well as vertically to make a connection between the portable verification system and a corresponding connection point of the field meter run or main pipeline.
Figure 3B:
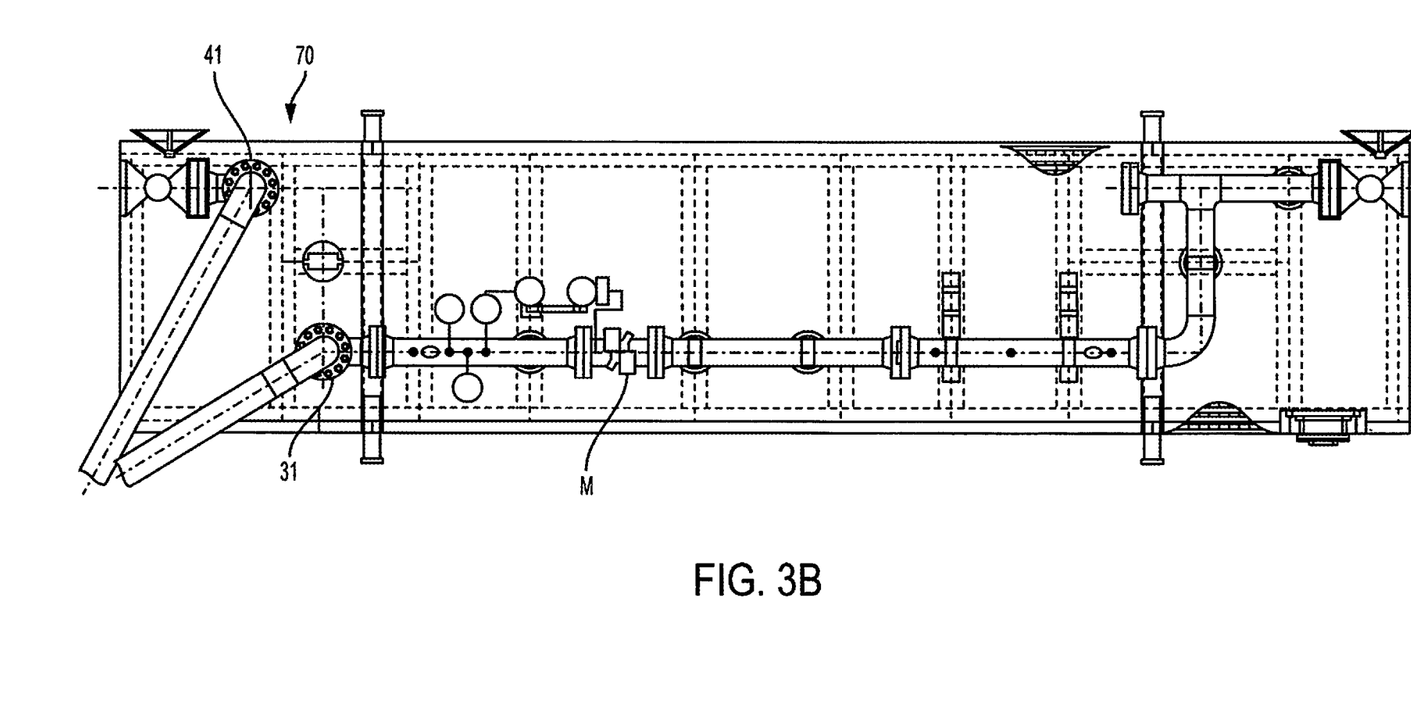
Figure 4:
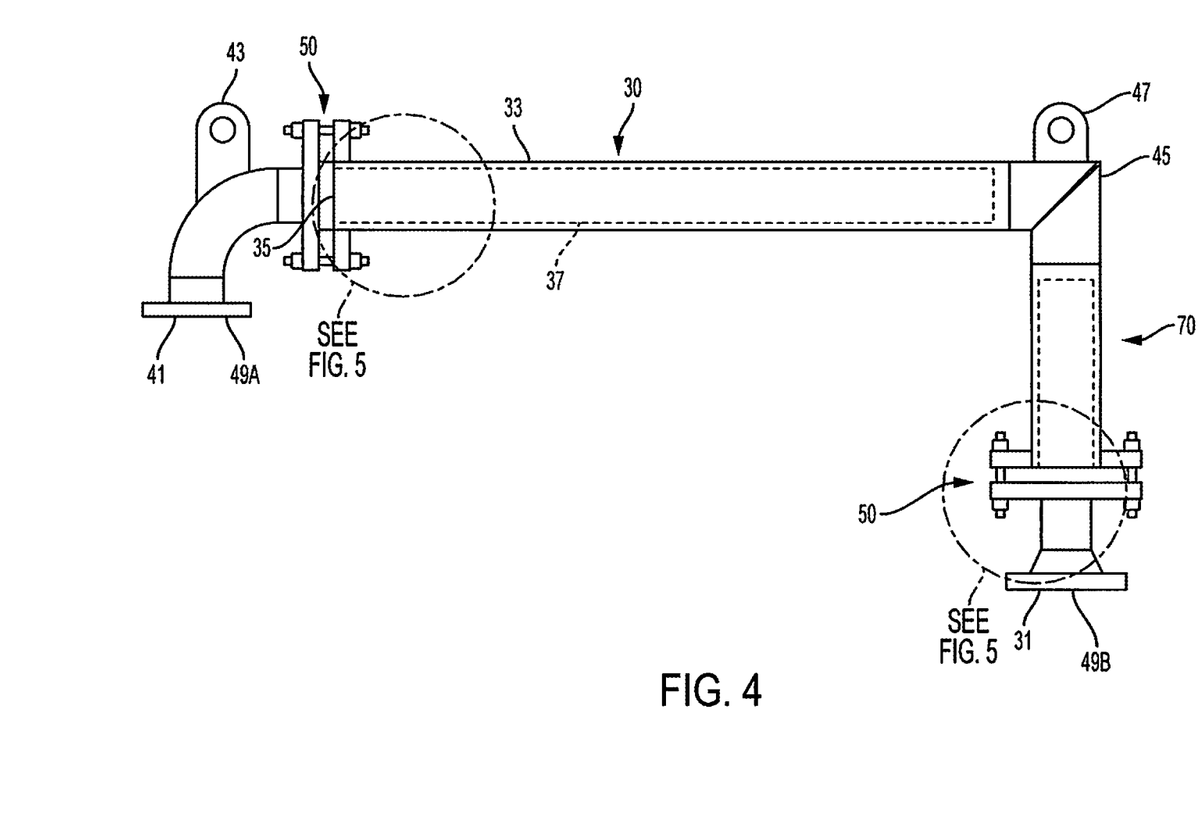
FIG. 4 is an embodiment of a slip joint adaptor that may be used to seal the linearly extendable pipeline section of FIG. 3.
Figure 5:
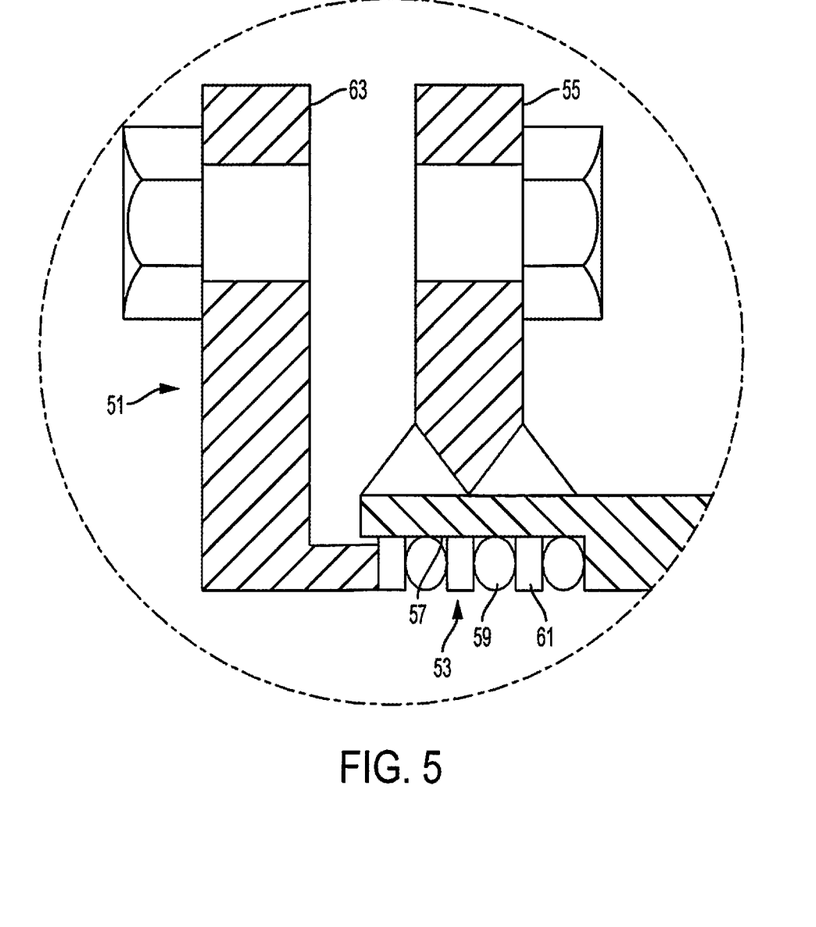
FIG. 5 is an enlarged view of the slip joint adaptor of FIG. 4.

As previously mentioned, additional piping geometry may be used to connect the inlet and outlet piping $10_I$, $10_O$ of the reference meter run 13 to the field meter run and main pipeline. This inlet and outlet piping may be configured for adjustment in horizontal length, vertical height, and clock position relative to a horizontal plane, the adjustment not affecting a gas flow measurement of the ultrasonic gas flow meter 15 of the reference meter run 13. Referring now to FIGS. 3 to 5, in some embodiments, at least one of the inlet and outlet ends 11, 21 includes at least one slip or linearly adjustable pipeline section 30 or 70 spanning between it and a corresponding connection point of the field meter run or main pipeline. The first linearly adjustable pipeline section 30 may be arranged to extend horizontally. For example, the linearly adjustable pipeline section 30 may extend in overall length in a range of about 10 to 25 feet. The second linearly adjustable pipeline section 70 may be arranged to extend vertically. For example, the linearly adjustable pipeline section 70 may extend in a range of 4 to 7 or 8 feet, permitting one section 30 to cross over another section 30. When used in combination, the sections 30 and 70 may be connected by an elbow 45 having a lift eye 47. The linearly adjustable pipeline section 70 may also be used to swivel or orient section 30 into a desired clock position or angular orientation relative to a horizontal plane.

The linearly adjustable pipeline sections 30, 70 can include an outer pipe 33, an inner pipe 37 housed by and extendable from the outer pipe 33, and means to seal 50 an end 35 of the outer pipe 33 about the inner pipe 37. The inlet or outlet ends 31, 41 of the section 30, 70 may include a lap joint flange 49A, 49B for connection to a corresponding inlet or outlet end 11, 21 of the portable verification system 5 or to the field meter run or main pipeline. In some embodiments, one end 31, 41 is an elbow and the other end 41, 31 is straight. A lift eye 43 may be added to the inlet or outlet end 31, 41.

The means to seal 50 the outer pipe 33 about the inner pipe 37 may be a slip joint 51 that includes a packing gland 53 arranged in a pocket 57 located between a head 55 and follower or pusher 63. In some embodiments, the packing gland 53 includes at least two O-rings 59 with a moveable spacer 61 located in between. As the pusher 63 is drawn toward the head 55, the O-rings 59 become compressed between the head 55 and spacer 61, and between the spacer 61 and pusher 63, and therefore expand into sealing engagement with pipe 37.

Figure 6:
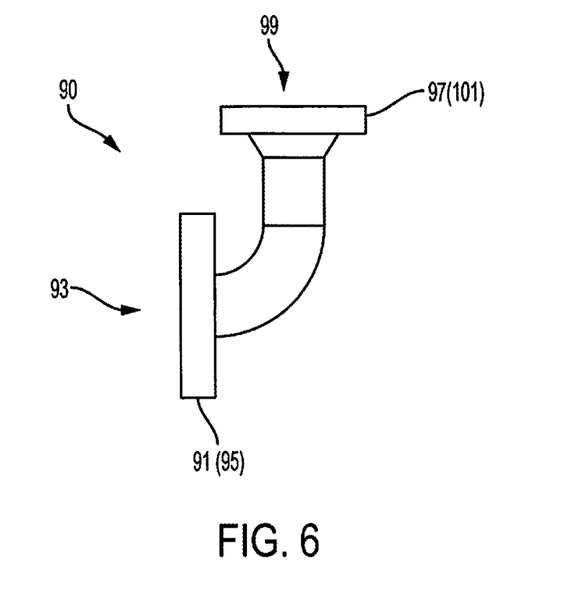
FIG. 6 is a front elevation view of an embodiment of an adaptor fitting that may be used to connect the inlet or outlet end to a corresponding outlet or inlet flange of the meter run or main pipeline, respectively.
Figure 7:
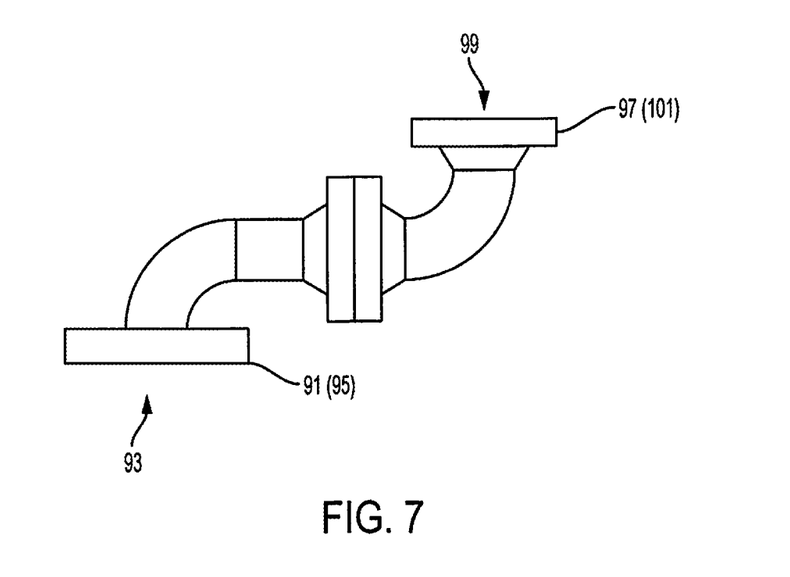
FIG. 7 is a front elevation view of another embodiment of an adaptor fitting. In embodiments, the flange on the meter run or main pipeline side of the fitting may vary from one adaptor to the next with the flange on the portable verification side of the fitting being the same across the different adaptor fittings.
Figure 8:
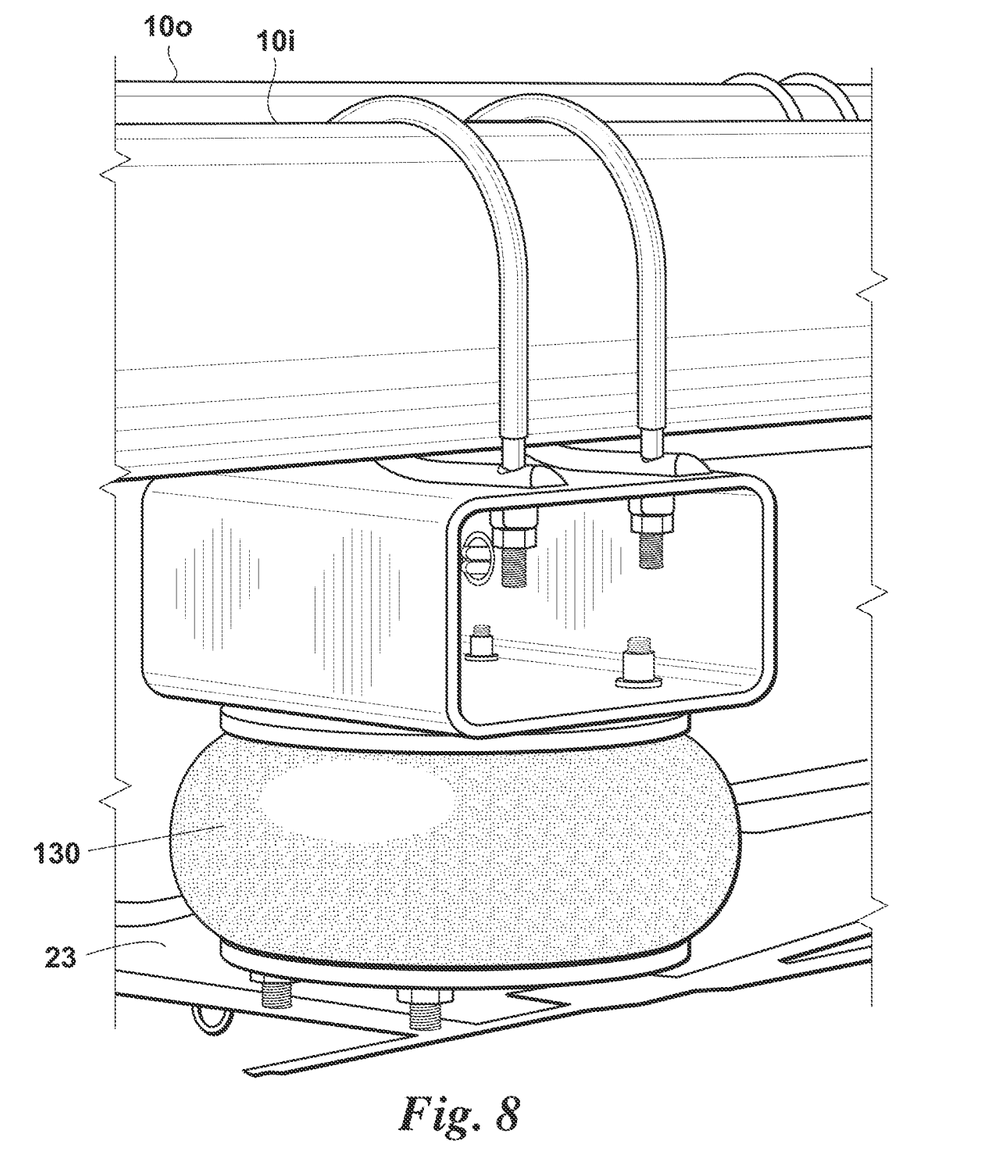
FIG. 8 is an isometric view of an embodiment of an air spring arrangement used to connect the reference meter run piping to a trailer.

Referring now to FIGS. 6 & 7, because of differences in connection flanges used on meter runs and main pipelines, the portable verification system 5 may also use at least one adaptor fitting 90. In embodiments, adaptor fitting 90 is connectable to the inlet or outlet ends 11, 21 of the portable verification system 5 or to the inlet or outlet ends 31, 41 of the linear adjustable pipeline sections 30, 70. The adaptor fitting 90 may have a first flange 91 at one end 93 having a first bolt hole pattern 95 and a second flange 97 at another end 99 having a second bolt hole pattern 101. The first and second flanges 91, 97 may differ from one another in bolt hole pattern 95, 101, diameter, or bolt hole pattern 95, 101 and diameter.

The first flange 91 may be adapted for connection to the inlet or outlet end 11, 21 (or 31, 41) of system 5, with the second flange 97 adapted for connection to the field meter run or main pipeline side. In other words, first flange 91 can be standard among adaptor fittings 90 but second flange 97 differs. In this way, the portable verification system 5 may be connected to a wide variety of different end treatment and main pipeline flange connections by simply changing the adaptor fitting 90.

Embodiments of a method of verifying a field ultrasonic gas flow meter when connected to a main pipeline transporting a gas include completing a circuit between the measurement section, the portable verification system 5, and the main pipeline; allowing a gas to flow through the field meter M and then through a calibrated ultrasonic gas flow meter 15 of the portable verification system 5; and comparing a volume of gas measured by the two meters M, 15.

Completing the circuit may include extending a first or a second linearly adjustable pipeline section 30, 70 (or both) from at least one of the inlet and outlet ends 11, 21. The method may also include changing a direction of the horizontal linearly adjustable pipeline section 30, for example, by swiveling the vertical linearly adjustable pipeline section 70 into a desired clock position or angle relative to a horizontal plane. Section 70 may be used vertically extend from the inlet or outlet ends 11, 21. The method may also include connecting an adaptor fitting 90 between at least one of the inlet end 11 and the downstream end of the measurement section or between the outlet end 21 and the main pipeline. An adaptor fitting 90 may also be used at the inlet or outlet ends 31, 41 of the linear adjustable pipeline sections 30, 70. After testing in the field, the reference meter run 13 may be disconnected from the field meter run and main pipeline section and moved to a different location to test a different field meter of a different field meter run and main pipeline section. The reference meter run 13 may also be left in place temporarily if the field meter and its run is sent to a calibration lab.

The method may also include changing a velocity of the volume of gas flowing through the portable verification system 5 (and therefore through the field meter M) between a first velocity and a second different velocity. The first velocity may be the field velocity. The second different velocity may be a velocity above or below the field velocity. Changing the velocity may be done by way of adjusting a flow control valve 19 located between the calibrated ultrasonic gas flow meter 15 and the outlet end 21 of the portable verification system 5.

As shown in FIGS. 3A & B, a plurality of pneumatic suspension devices or air springs 130 may be located between portions of piping 10 of the reference meter run 13 and the measurement trailer 23. Truck or trailer application air springs are a suitable air spring 130. The air springs 130 "float" the piping 10 above the trailer 23 and provide shock absorption, positioning adjustment of the rigid piping 10 relative to the trailer 23, and height adjustment of the piping 10. For example, one portion of the piping 10 may be lowered and another raised. The air springs 130 may be in communication with a pneumatic control system (not shown) to lower or raise the height of the air springs 130.

The embodiments that have been described here provide illustrative examples. The disclosure extends to all functionally equivalent structures, methods, and uses that fall within the scope of the following claims.

What is claimed:

1. A wheeled trailer comprising:
a plurality of air springs located on a top surface of the wheeled trailer;
a reference meter run including an ultrasonic gas flow meter calibrated for use with a piping geometry of the reference meter run, the piping geometry including an inlet end and an outlet end, at least a portion of the piping geometry connected to the plurality of air springs; and
adjustable inlet and outlet piping connectable, respectively, to the inlet end and an outlet end of the reference meter section, said adjustable inlet and outlet piping adjustable in horizontal length, vertical height, and, relative to a horizontal plane, rotational position.

2. The wheeled trailer of claim 1, wherein, the first in-field gas flow meter run has a first piping geometry connected to a first main pipeline section and the second in-field gas flow meter run has a second piping geometry different than that of the first piping geometry and connected to a second main pipeline section; and
wherein the piping geometry of the reference meter run is different than that of the first and second piping geometries; and
wherein the adjustable inlet piping is connectable to a corresponding downstream end of the first and second in-field gas flow meter runs; and
wherein the adjustable outlet piping is connectable to a corresponding one of the first and second main pipeline sections.

3. The wheeled trailer of claim 1, further comprising:
the outlet end of the reference meter run including a flow control valve.

4. The wheeled trailer of claim 1, further comprising:
the adjustable inlet piping including an adaptor fitting configured for connection to a corresponding one of the first and second field meter runs.

5. The wheeled trailer of claim 1, further comprising:
the adjustable outlet piping including an adaptor fitting configured for connection a corresponding one of the first and second main pipeline sections.

6. The wheeled trailer of claim 1, further comprising:
the piping geometry of the reference meter run including at least one turn upstream of the ultrasonic gas flow meter.

7. The wheeled trailer of claim 1, further comprising:
at least one of the adjustable inlet piping and the adjustable outlet piping including:
a linearly adjustable pipeline section comprising:
an outer pipe;
an inner pipe housed by and extendable from the outer pipe; and
a slip joint configured for sealing the outer pipe about the inner pipe.

8. The wheeled trailer of claim 7, further comprising:
the slip joint including a packing gland, a packing gland pocket, and a packing gland pusher.

9. The wheeled trailer of claim 8, further comprising:
the packing gland pocket including at least two O-rings and a spacer ring located between the at least two O-rings.

10. A method of verifying a first in-field gas flow meter when connected to a first main pipeline section transporting natural gas, the first in-field gas flow meter connected to the first main pipeline section by a first in-field gas flow meter run having a first piping geometry, the first in-field gas flow meter previously calibrated for use with the first piping geometry, the method comprising;
completing a circuit between the first in-field gas flow meter run, a portable verification system, and the first main pipeline section;
permitting the natural gas to flow from the first main pipeline section through the first in-field gas flow meter run and into and through the portable verification system and back into the first main pipeline section; and measuring an amount of natural gas flowing through the first in-field gas flow meter run and through the portable verification system;

wherein the portable verification system comprises:
a wheeled trailer;
a plurality of air springs located on a top surface of the wheeled trailer;
a reference meter run including an ultrasonic gas flow meter calibrated for use with a piping geometry of the reference meter run, the piping geometry including an inlet end and an outlet end, at least a portion of the piping geometry connected to the plurality of air springs; and
adjustable inlet and outlet piping connectable, respectively, to the inlet end and an outlet end of the reference meter section, said adjustable inlet and outlet piping adjustable in horizontal length, vertical height, and, relative to a horizontal plane, rotational position;

wherein the completing the circuit includes adjusting the adjustable inlet and outlet piping, the adjustable inlet and outlet piping when in a connected state not affecting a gas flow measurement of the ultrasonic gas flow meter of the reference meter run.

11. The method of claim 10, further comprising:
changing a velocity of the natural gas flowing through the portable verification system between a first velocity and a second different velocity.

12. The method of claim 11, wherein the changing the velocity includes adjusting a flow control valve located toward an outlet end of the reference meter section.

13. The method of claim 10, wherein the adjustable inlet piping includes an adaptor fitting connectable to first in-field gas flow meter run.

14. The method of claim 10, wherein the adjustable outlet piping includes an adaptor fitting connectable to the first main pipeline section.

15. The method of claim 10, wherein the piping geometry of the reference meter section includes at least one turn upstream of the ultrasonic gas flow meter.

16. The method of claim 10, wherein at least one of the adjustable inlet piping and the adjustable outlet piping include a linearly adjustable pipeline section comprising:
an outer pipe;
an inner pipe housed by and extendable from the outer pipe; and
a slip joint configured for sealing the outer pipe about the inner pipe.

17. The method of claim 16, wherein the slip joint includes a packing gland, a packing gland pocket, and a packing gland pusher.

18. The method of claim 17, wherein the packing gland pocket includes at least two O-rings and a spacer ring located between the at least two O-rings.

19. The method of claim 10, further comprising:
disconnecting the portable verification system from the first in-field meter run and the first main pipeline section;
moving the portable verification system to a second in-field gas flow meter connected to a second main pipeline section transporting natural gas, the second in-field gas flow meter connected to the second main pipeline section by a second in-field gas flow meter run having a second piping geometry different than that of the first piping geometry, the second in-field gas flow meter previously calibrated for use with the second different piping geometry;
completing a circuit between the second in-field gas flow meter run, the portable verification system, and the second main pipeline section;
permitting the natural gas to flow from the second main pipeline section through the second in-field gas flow meter run and into and through the portable verification system and back into the second main pipeline section; and
measuring an amount of the natural gas flowing through the second in-field gas flow meter run and through the portable verification system.

20. A wheeled trailer comprising:
a plurality of air springs located on a top surface of the wheeled trailer;
a reference meter run including an ultrasonic gas flow meter calibrated for use with a piping geometry of the reference meter run, the piping geometry including an inlet end and an outlet end, at least a portion of the piping geometry connected to the plurality of air springs.

21. The wheeled trailer of claim 20, further comprising, inlet and outlet piping connected, respectively, to the inlet end and an outlet end of the reference meter section, the inlet and outlet piping adjustable in horizontal length, vertical height, and, relative to a horizontal plane, rotational position.

22. The wheeled trailer of claim 21, further comprising:
at least one of the adjustable inlet piping and the adjustable outlet piping including:
a linearly adjustable pipeline section comprising:
an outer pipe;
an inner pipe housed by and extendable from the outer pipe; and
a slip joint configured for sealing the outer pipe about the inner pipe.

23. The wheeled trailer of claim 22, further comprising:
the slip joint including a packing gland, a packing gland pocket, and a packing gland pusher.

24. The wheeled trailer of claim 23, further comprising:
the packing gland pocket including at least two O-rings and a spacer ring located between the at least two O-rings.

* * * * *